Figure 1:
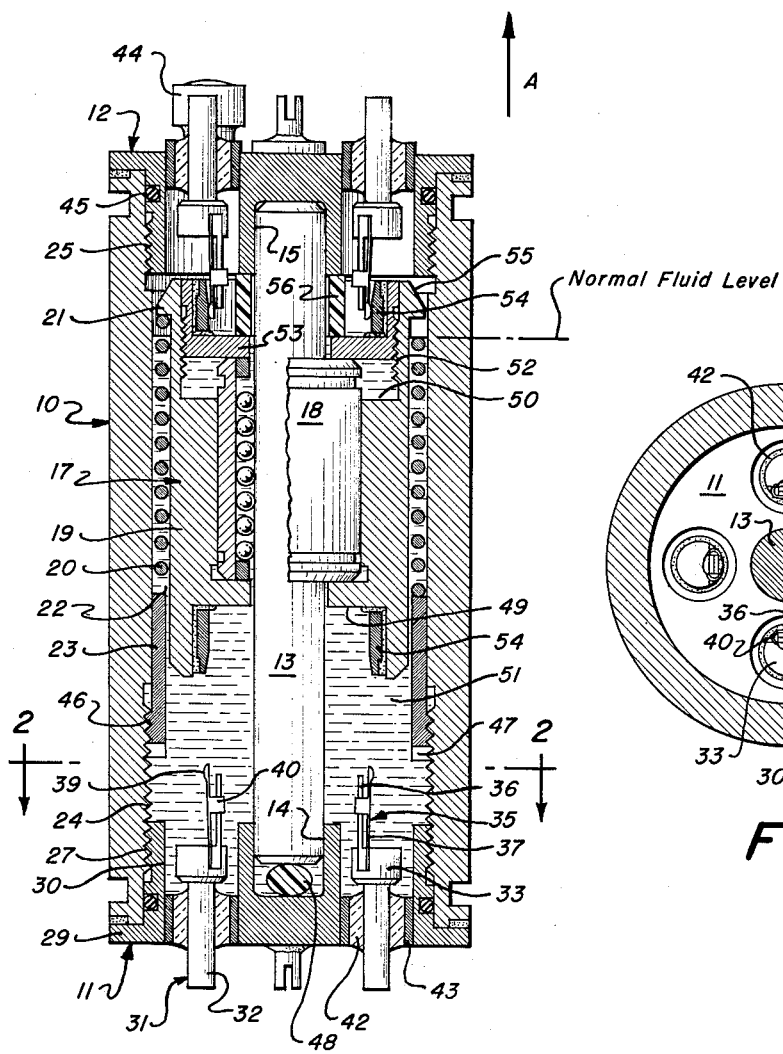

July 2, 1963 — A. F. CHABREK ETAL — 3,096,411
ACCELERATION RESPONSIVE SWITCH
Filed Aug. 24, 1961

INVENTORS:
Alex F. Chabrek
Russell L. Maxwell
BY
Roland A. Gunderson
Attorney

United States Patent Office 3,096,411
Patented July 2, 1963

3,096,411
ACCELERATION RESPONSIVE SWITCH
Alex F. Chabrek and Russell L. Maxwell, both of Albuquerque, N. Mex., assignors, by mesne assignments, to the United States of America as represented by the United States Atomic Energy Commission
Filed Aug. 24, 1961, Ser. No. 133,750
5 Claims. (Cl. 200—61.53)

The present invention relates generally to means or a device which may be utilized for measuring acceleration and more particularly to an accelerometer capable of effecting the operation of a circuit or mechanism at a predetermined high level of acceleration and then effecting the operation of a second circuit, mechanism or reset circuit at a predetermined lower level of acceleration.

It is frequently desirable to operate a switch or control some circuit or mechanism in response to acceleration of a vehicle or the like. Performance requirements of many vehicles make it essential that the circuit or mechanism be controlled by an acceleration responsive device having a high degree of accuracy and reliability and yet of rugged and of relatively simple and compact construction.

The present invention aims to achieve the above and other desirable qualities by providing a rugged accelerometer of simple design which is capable of performing its desired functions with a high degree of accuracy and reliability. The invention further contemplates the provision of controlling a circuit or mechanism or a pair of such circuits or mechanisms at different acceleration levels by providing a movable circuit closing mass which is controlled by a bias means capable of being preset to effect such circuit closing at predetermined and different acceleration levels.

An object of the present invention is to provide a new and improved accelerometer that is of relatively rugged, simple, compact, lightweight and inexpensive construction.

Another object of the invention is to provide an accelerometer highly resistant to shock and vibration.

Another object of the invention is to provide an accelerometer with a readily adjustable means for determining the acceleration level necessary to effect the operation of the desired control.

A further object of the present invention is to provide an adjustable bias means for effecting circuit closing or opening at different predetermined levels of acceleration.

A further object of the invention is to provide a circuit closing mass capable of linear movement substantially unopposed by frictional forces throughout its length of travel within the accelerometer.

A still further object of the invention is to provide a novel damping means which renders the accelerometer incapable of objectionable operation when subjected to instantaneous high level shocks.

A still further object of the invention is to provide a novel circuit contact arrangement which permits circuit closing by the movable mass regardless of environmental conditions.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 2:
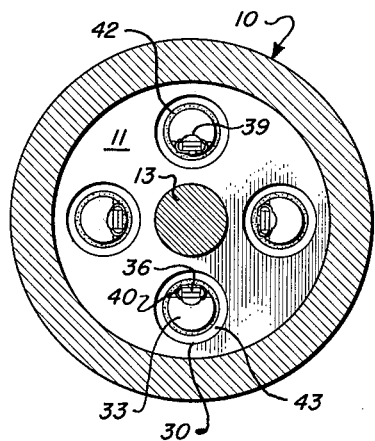

In the accompanying drawings:
FIG. 1 is a longitudinal sectional view illustrating the inner components of the present invention; and
FIG. 2 is a plan view along lines 2—2 of FIG. 1 showing the contact arrangement with the damping liquid removed.

Described generally the accelerometer of the present invention is shown comprising a cylindrical housing 10 having contact carrying end plates 11 and 12 secured to opposite ends thereof. A stationary shaft 13, which is normally coaxially disposed within the housing 10 and held in such position by suitable shaft receiving receptacles 14 and 15 in the end plates 11 and 12 respectively, is adapted to provide a mounting and guide means for a longitudinally movable sensing mass 17 coaxially arranged about the shaft 13, and which mass in turn carries a ball bushing 18 adjacent the shaft and a contact shorting ring adjacent each end. Movement of the mass 17 through the cylinder is controlled by an encircling helical compression spring 20, one end of which normally abuts an annular lip 21 on the movable mass with the other end abutting an annular shoulder 22 on an adjustable ring 23, which determines the bias of the spring upon the mass. As the "set-back" or acceleration ($g$) forces increase above a predetermined minimum, due to movement of the device in same such direction as indicated by the arrow A, the mass 17 tends to move away (downwardly in FIG. 1) from one end of the housing, opening a reset circuit (not shown) and compressing the spring. As the mass thus moves and as the $g$ forces attain a preset high level, which is determined by the position of the ring 23 and the mass bias provided by the spring 20, a shorting ring on one end of the mass engages the contacts shown carried by the end plate 11 and closes an external actuation circuit (not shown).

Described more particularly the accelerometer device disclosed in FIGS. 1 and 2 comprises a metal cylindrical housing 10 which may be provided with threaded inner surfaces 24 and 25 for receiving and securing the end plates 11 and 12 therein as will be described below. The length of the threaded surface 24 adjacent one end of the housing may be somewhat longer than the length of the threaded surface 25 adjacent the other end of the housing so as to provide a positive seating surface for the adjustable ring 23.

End plates 11 and 12 may be of substantially similar construction; therefore, only the structural details of end plate 11 will be described below so as to avoid unnecessary redundancy. End plate 11 may be normally made of metal and include a threaded outer section 27 adapted to mate with the threaded housing surface 24 and an annular lip portion 29 which normally abuts the housing end when the plate 11 is threaded into its proper position within the housing. Four circumferentially arranged and equally spaced throughgoing apertures 30 (FIG. 2) may be provided in the end plate 11 for housing contact supports 31, each of which may comprise a terminal portion 32 and a contact housing portion 33, with the latter being provided with a small slot for containing a non-latching actuation contact 35 which may be secured therein in any suitable manner, such as, for example, soldering or the like. The actuation contact 35 may comprise a first section 36 of relatively inflexible metal and a second section 37 of relatively thin and flexible metal, which may be a gold alloy or the like. The second section may be secured to the first section by soldering or in any other suitable manner and may include an outwardly disposed lobe 39 adjacent the distal end thereof for contacting the mass 17 and a pair of tab-like extensions 40 intermediate the ends of the second section. The second section 37 may be secured to the first section 36 in such a manner or be formed in such a shape that the lobed end 39 is normally biased radially outwardly from the distal end of the first section. The lobed end may be moved a desired distance toward the first section and then the tab-like projections 40 may be bent about the first section 36, for providing a resilient and positive non-engaging contacting surface for the movable mass 17 as will be described in detail below.

The contact support 31 may be placed in the aperture 30 and secured to and electrically insulated from the end plate 11 in any suitable manner, such as, for example, by placing a glass bead 42 and a surrounding gold plated spacer 43 about the terminal section 32 and then in any desired manner provide a glass-to-metal seal for sealing the aperture as well as electrically isolating and securely attaching the contact support 31 to the end plate 11. The shaft-retaining receptacle 14 may be preferably centrally located in the end plate 11 and while the depth of such receptacle need not be held within rigid limits it should be sufficiently deep so that when the shaft 13 is positioned therein there remains sufficient room for endwise movement of the shaft which may be compensated for in a manner to be described.

The major difference between end plate 11 and the opposite end plate 12 lies in the provision of a means for introducing a damping liquid into the housing after both end plates are in their desired positions. This provision may readily be accomplished by providing either end plate, preferably plate 12, with an additional throughgoing aperture through which a sealable fill tube 44 may be inserted. While each end plate contains four contacts, as shown in FIG. 2, it will be obvious to use any number of contacts depending upon desired results. However, the use of two pair of contacts with the contacts of each pair being electrically coupled to each other sets forth a desirable feature in that if the accelerometer is subjected to shock or vibration which may tend to displace one contact out of alignment with the shorting ring on the mass 17 then the other contact of that pair will normally still be capable of contacting the shorting ring for completing the circuit.

A desirable liquid seal may be established between the housing 10 and the end plates by providing an annular groove 45 in the end plates between the threaded section 27 and the annular lip 29 and then placing an O-ring or the like in the groove. The end plates may each be soldered to the housing 10 adjacent the end plate lip 29 so as to provide a hermetic seal between the housing and the end plates.

Prior to securing end plate 11 to the housing 10 the adjustable ring 23, which may be provided with an externally threaded section 46 and a pair of notches 47 for facilitating the engagement of a ring inserting tool (not shown), may be positioned within the housing and staked in place. The correct position of ring 23 in the housing 10 may readily be determined by measuring the compressive strength of the particular spring 20 which will yield sufficiently so as to allow the known weight of the mass to move under the influence of a predetermined acceleration force and close the circuit actuation contacts on end plate 11, and then by known calibration methods such measurements may be used to properly locate the ring 23 within the housing 10.

After the ring 23 and the end plate 11 are secured in the housing 10 the shaft 13, the diameter of which should be held within very rigid limits, may be placed in the housing with one end sliding into the socket 14 and the other end properly oriented to be received in socket 15 of end plate 12. To properly position the shaft 13 in the housing 10 when both end plates are in place it has been found that by placing a small ball 48 of resilient material, such as nylon or the like, between the end of the shaft 13 and the bottom of receptacle 14 substantially all tolerances which may occur due to over length or under length of the shaft may be compensated for, thus providing a substantially rigidly held and properly positioned shaft.

Either prior to the insertion of the shaft into the housing or immediately thereafter the helical compression spring 20, which has been previously calibrated for correct mass release at desired acceleration levels, bay be slipped into the housing with one end abutting the shoulder 22 on the ring 23. It may be desirable to provide the shoulder 22 with an inwardly disposed longitudinally extending lip so as to prevent the spring end from contacting the mass.

The sensing mass 17, which is preferably annular in form, comprises a main body member 19 that normally includes a pair of centrally located and oppositely disposed recesses 49 and 50. Recess 50, which may have an outer diameter slightly greater than that of recess 49, may have the side wall thereof provided with a threaded section 52 and the inner end wall counterbored to a depth terminating adjacent the inner end wall of recess 49. A ball bushing 18, which may be of any suitable commercially available design that permits a desired degree of frictionless movement between it and a guide shaft, may be placed into the counterbore with one end abutting the base of the bore. After placing the ball bushing 18 into the counterbore an annular cup shaped member 53, which may be provided with an externally threaded surface for mating with threads 52, may be screwed into recess 50 to abut the other end of the ball bushing 18 and secure the latter in place.

To provide a means for adequately shorting either set of contacts and yet prevent the grounding of the circuit through the mass 17 and the housing 10 there may be provided within the recess 49 and the cup shaped member 53 in recess 50 annular shorting rings 54 each having the outer end of the inner wall thereof beveled to ease engagement of the shorting ring with the lobe 39 on the contacts and which may be made of any desirable electrically conducting material, such as a gold alloy or the like. The rings 54 may be secured to the main body 19 and be sufficiently insulated therefrom by using suitable insulating bonding material, such as epoxy or the like. It may be desirable to provide a notch in the outer surface of the rings 54 so as to permit a better bond between the rings 54 and the main body 19.

The outer diameter of the mass 17 is slightly less than the inner diameter of the ring 23 so as to permit relatively frictionless movement therebetween and also allow the passage of damping liquid 51 to either end of the mass 17. Adjacent one end of the mass 17, which preferably may be the end housing the cup shaped member 53, there may be an annular outwardly disposed lip 21 that is adapted to engage the other end of the spring 20 so as to cause continual urging of the mass towards end plate 12 while preventing movement of the mass toward the end plate 11 until the desired minimum $g$ force is attained. The lip 21 may be provided with a chamber 55 about its periphery for easing the passage of the damping liquid 51 between the lip and the inner end of the end plate 12.

While the end plates 11 and 12 and the cup shaped member 53 are shown as being joined to the housing 10 and the mass 17, respectively, by an arrangement of mating threads it will be obvious that each of these elements may be appropriately secured in its proper position by other methods, such as, for example, by a pressed fit or the like. Also while the shorting rings 54 are normally positioned on the mass 17 in an inwardly facing manner it will appear obvious that such rings or their equivalents may be placed on the mass in other orientations, such as in an outwardly facing manner.

After the accelerometer is assembled, which may be done as above described, a suitable damping liquid 51 may be introduced into the housing through the fill tube 44. The damping liquid, which may be of any suitable nonconducting type, such as, for example, a silicone oil having a viscosity of about .65 centistoke, functions primarily as a vibration damping liquid which prevents objectionable opening and closing of the reset or "initial" contacts and also serves as a shock damping liquid for preventing a severe short duration shock, i.e., a shock greater than the preset level of acceleration necessary to short the actuation contacts, from prematurely closing the circuit associated with the actuation contacts. The silicone oil has been found to function very satisfactorily in the present device in that by suitably heating the housing and the enclosed damping liquid, which may substantially fill the housing, to approximately 180° F. and then sealing the fill tube 44 before reducing the entire assembly to room temperature will provide a small space or "void" at room temperature as shown in FIG. 1 above the liquid level line, which does not interfere with the operation of the accelerometer and yet sets forth a means of compensating for thermal expansion.

In some instances it has been found that vibration of the accelerometer causes an abrading action between the top of the mass 17 and the bottom or the inwardly disposed end of the end plate 12 which may cause objectionable deposits of minute particles from the mass or the end plate in places, such as, the ball bushing and adjacent the contacts. This problem may be easily overcome by placing a loose fitting bushing 56 of nylon or any other suitable material and of a height slightly greater than the depth of the recess in the cup shaped member 53 about the shaft 13 intermediate the inner wall of the cup shaped member 53 and the end plate 12. Thus, when the bushing abuts the end plate 12 there remains sufficient space between the end of the mass 17 and the end plate 12 so as to prevent the objectionable abrading action of the mass 17 against the end plate 12.

Normally the clearances between the mass 17 and the ring 23 are such that the damping liquid 51 easily passes therebetween so as not to interfere with normal operation of the accelerometer. Also some of the liquid may also pass between the ball bushing 18 and the shaft 13 thus lubricating the ball bushing while providing an additional liquid flow passage.

It will be seen that the device of the present invention sets forth a highly desirable accelerometer which provides many advantages some of which have heretofore been found only in complex, expensive and relatively bulky accelerometers. With the present device, if it is desired to operate a control circuit in a vehicle at g level such as 6.2 and then operate the reset circuit at a lower g level such as 5, the system of the present invention can be readily and inexpensively adaptable to such requirements in that all that is necessary is to measure the desired g settings on the helical compression spring to be used with the particular device and then transpose such calibrations to the adjustable ring for properly positioning the latter. Also another feature of the present invention is the capability of effecting the operation of the actuation circuit at a very low g level such as in the order of 1.6 g and yet even at this low level a severe shock of short duration and having a magnitude immensely greater than 1.6 g will not cause premature closing of the actuation circuit. Precompressing the helical spring sets forth another desirable feature in that the mass will be tightly held against the end plate 12 until the minimum g level necessary to open the reset circuit is attained, thus providing a greater degree of control over circuit operation than would be available when using a spring that is not precompressed.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A device of the character described comprising the combination of an elongate housing, end plates for closing opposite ends of said housing, electrical contact means mounted on each end plate within said housing, a guide shaft extending between and supported in the housing by said end plates, a ball bushing encircling said shaft and movable thereupon, an annular acceleration responsive mass having centrally disposed recesses in opposite ends thereof surrounding said shaft and affixed to said bushing, a shorting ring disposed in each of said recesses, means securing said rings to said mass and insulating them therefrom, a selectively settable adjusting ring carried by said housing, and helical compression spring means encircling said mass and disposed between one end of said settable adjusting ring and a portion of said mass for continuously forcing said mass toward one of said end plates, the compression force of said spring means against said mass opposing mass movement toward the other of said end plates being selectively determinable by moving the settable adjusting ring.

2. The device as in claim 1 wherein each of said contacts means on the end plates includes a supporting section, an elongated relatively rigid member and an elongated resilient flexible member, and further including means for mounting and electrically insulating said supporting section on its respective end plate and extending longitudinally through an aperture in its respective end plate so that one end of said support is within the housing, means for mounting one end of both said flexible and rigid members on said one end of said supporting section so that the flexible and rigid members extend longitudinally within the housing; said flexible member including a lobe at its other end and means including a pair of tab-like projections intermediate said one and said other end cooperating with said rigid member for holding said lobed end of the resilient member in a predetermined relationship to one of the shorting rings.

3. The device as in claim 1 and further including means for damping said mass including a liquid, and means for spacing said mass from the said one end plate toward which the mass is normally forced by the spring, said last named means including an annular spacing washer positioned about the shaft between the mass and the said one end plate.

4. A device of the character described comprising the combination of a cylindrical housing having threaded inner surfaces adjacent each end thereof with one of said threaded surfaces extending longitudinally on the inner surface of the housing a distance greater than the other of said threaded surfaces, a selectively settable adjusting ring having a threaded outer portion engaging with the longer of the threaded surfaces, a pair of end plate means each having threaded portions engaging with one of said threaded surfaces for closing an end of said housing and an inwardly facing receptacle, shaft means, said receptacles including means for positioning said shaft within said housing coaxially with the axis of said housing and with the ends of the shaft in the receptacles, means within one of said receptacles adjacent one end of said shaft for absorbing tolerance differences in the shaft length, a ball bushing encircling said shaft and longitudinally movable with respect thereto, a movable mass secured to said bushing and having an annular outwardly disposed lip adjacent an end remote from said adjusting ring, a recess in each end of said mass containing a shorting ring secured to the side wall of the recess by insulating bonding means, a helical compression spring encircling said mass and positioned between said settable adjusting ring and said lip for continuously urging said mass toward one end of said housing, contact means on each of said end plates extending inwardly into the housing, said contact means comprising a plurality of flexible lobed contacts, said contact means each positioned for connecting with one of said shorting rings, and means for damping said mass.

5. The device in claim 4 wherein said contact means includes two pairs of flexible contacts on each end plate, and further including means for spacing said flexible contacts equal distances apart from each other about the circumference of the end plate, and means for electrically connecting each pair of flexible contacts to each other.

References Cited in the file of this patent

UNITED STATES PATENTS

| | | |
|---|---|---|
| 2,854,539 | Ruppel | Sept. 30, 1958 |
| 2,950,908 | Rainsberger | Aug. 30, 1960 |
| 3,018,664 | Humble | Jan. 30, 1962 |